United States Patent
Shimizu et al.

(10) Patent No.: US 10,525,771 B2
(45) Date of Patent: *Jan. 7, 2020

(54) RUBBER COMPOSITION

(71) Applicant: The Yokohama Rubber Co., LTD., Minato-ku, Tokyo (JP)

(72) Inventors: Katsunori Shimizu, Hiratsuka (JP); Tsuyoshi Nomaguchi, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/093,551

(22) PCT Filed: Apr. 5, 2017

(86) PCT No.: PCT/JP2017/014257
§ 371 (c)(1),
(2) Date: Oct. 12, 2018

(87) PCT Pub. No.: WO2017/179471
PCT Pub. Date: Oct. 19, 2017

(65) Prior Publication Data
US 2019/0126683 A1    May 2, 2019

(30) Foreign Application Priority Data
Apr. 14, 2016 (JP) ................. 2016-081304

(51) Int. Cl.
*B60C 1/00* (2006.01)
*C08K 5/44* (2006.01)
(Continued)

(52) U.S. Cl.
CPC ............. *B60C 1/00* (2013.01); *B60C 9/20* (2013.01); *C08K 5/44* (2013.01); *C08K 5/55* (2013.01);
(Continued)

(58) Field of Classification Search
CPC .... B60C 9/20; B60C 1/00; C08K 5/55; C08K 5/44; C08L 7/00; C08L 9/00; C08L 161/06
See application file for complete search history.

(56) References Cited

U.S. PATENT DOCUMENTS

2010/0200141 A1* 8/2010 Yamamoto ................ B60C 1/00
                                                                  152/527
2012/0285599 A1  11/2012 Miyazaki
2014/0228495 A1   8/2014 Miyazaki

FOREIGN PATENT DOCUMENTS

EP      3441239 A1 *  2/2019 .............. B60C 9/04
JP   2002-327093     11/2002
(Continued)

OTHER PUBLICATIONS

Machine translation of JP 2011-231221. (Year: 2011).*
International Search Report for International Application No. PCT/JP2017/014257 dated Jun. 27, 2017, 4 pages, Japan.

*Primary Examiner* — John E Uselding
(74) *Attorney, Agent, or Firm* — Thorpe North & Western

(57) ABSTRACT

A rubber composition includes: in a diene rubber containing a natural rubber, cobalt borate neodecanoate, a phenol-based resin, and a curing agent; a dynamic storage modulus (E') at 20° C. and a dynamic strain of 2% being 13 MPa or greater; a loss tangent (tan δ) at 60° C. being 0.20 or less; and the number of repetitions until breakage in a constant strain fatigue test at a strain of 60% and 400 rpm being 35000 times or greater.

3 Claims, 1 Drawing Sheet

(51) Int. Cl.
*C08K 5/55* (2006.01)
*C08L 7/00* (2006.01)
*C08L 9/00* (2006.01)
*C08L 61/06* (2006.01)
*B60C 9/20* (2006.01)
*B60C 9/00* (2006.01)
*B60C 9/18* (2006.01)

(52) U.S. Cl.
CPC .................. *C08L 7/00* (2013.01); *C08L 9/00* (2013.01); *C08L 61/06* (2013.01); *B60C 9/0007* (2013.01); *B60C 2001/0066* (2013.01); *B60C 2009/1828* (2013.01)

(56) References Cited

FOREIGN PATENT DOCUMENTS

| | | |
|---|---|---|
| JP | 2005-255709 | 9/2005 |
| JP | 2007-099868 | 4/2007 |
| JP | 2011-052189 | 3/2011 |
| JP | 2011-057374 | 3/2011 |
| JP | 2011-231221 | 11/2011 |
| JP | 2012-177021 | 9/2012 |
| JP | 2012-236958 | 12/2012 |
| JP | 2013-122038 | 6/2013 |
| WO | WO 2013/069359 | 5/2013 |

\* cited by examiner

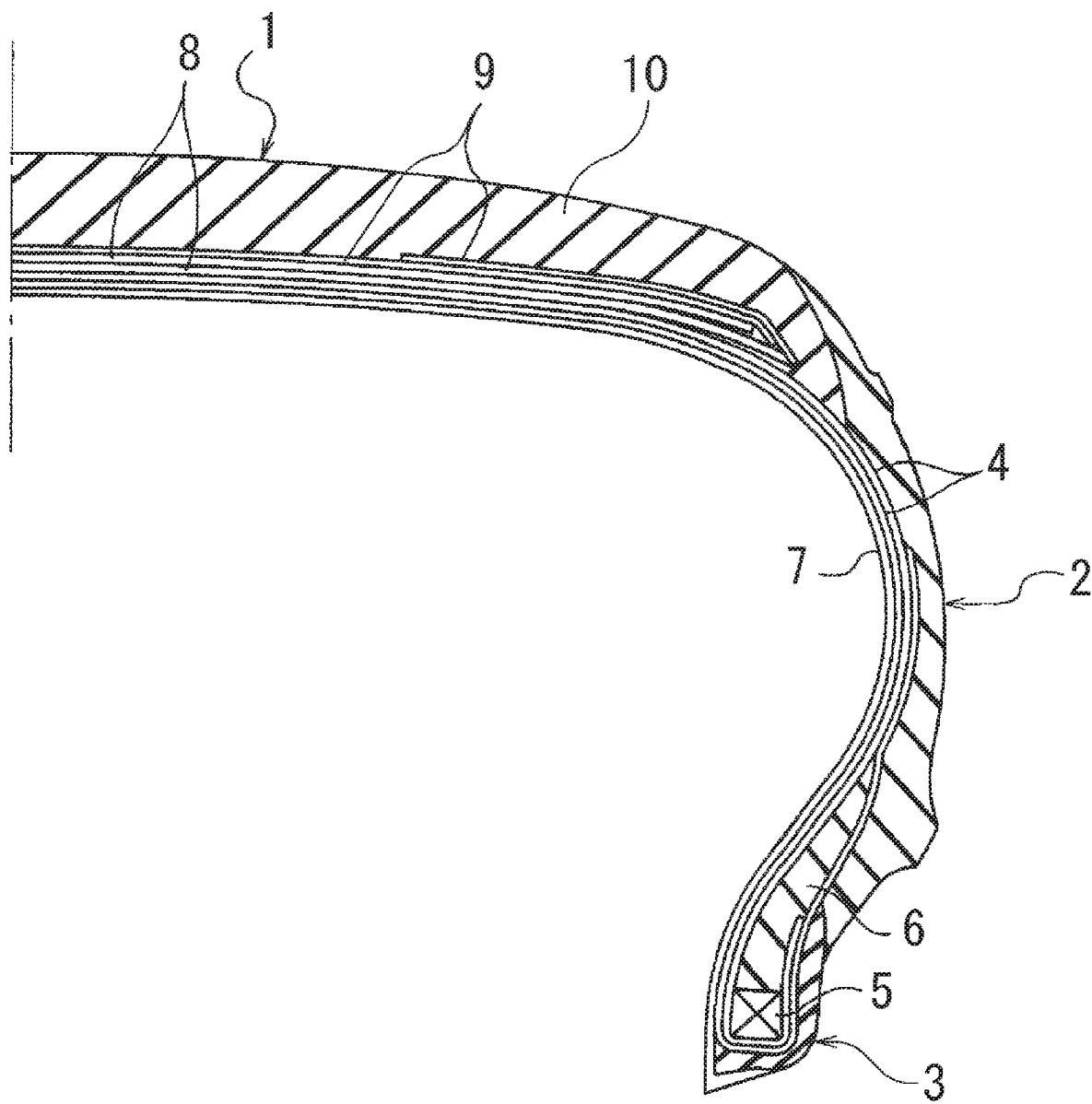

RUBBER COMPOSITION

TECHNICAL FIELD

The present technology relates to a rubber composition that enhances adhesive performance to steel cords.

BACKGROUND ART

Some pneumatic tires have a tread portion formed from a belt layer and a carcass layer in which steel cords are coated with a coating rubber (rubber composition for coating steel cords). As adhesiveness between these steel cords and the rubber member is reduced as a result of use for a long period of time, failure tends to occur, and tire durability tends to deteriorate. However, in recent years, the period of use of a tire tends to be longer, and it becomes more important to enhance reinforcing effect by the steel cords and to maintain durability for a long period of time.

Japan Unexamined Patent Publication No. 2007-099868 proposes to enhance adhesiveness to steel cords by a rubber composition containing organic acid cobalt salt in a diene rubber. However, even higher levels of improvement in adhesiveness to steel cords have been demanded by consumers.

SUMMARY

The present technology provides a rubber composition by which adhesive performance to steel cords is enhanced equal to or beyond conventional levels.

The rubber composition of an embodiment of the present technology includes: in a diene rubber containing a natural rubber, cobalt borate neodecanoate, a phenol-based resin, and a curing agent; a dynamic storage modulus (E') at 20° C. and a dynamic strain of 2% being 13 MPa or greater; a loss tangent (tan δ) at 60° C. being 0.20 or less; and the number of repetitions until breakage in a constant strain fatigue test at a strain of 60% and 400 rpm being 35000 times or greater.

The rubber composition of an embodiment of the present technology can enhance the adhesive performance to steel cords equal to or beyond conventional levels and the tire durability can be enhanced because the rubber composition including: in a diene rubber containing a natural rubber, cobalt borate neodecanoate, a phenol-based resin, and a curing agent; a dynamic storage modulus (E') at 20° C. being 13 MPa or greater; a loss tangent (tan δ) at 60° C. being 0.20 or less; and, in a constant strain fatigue test at a strain of 60% and 400 rpm, breakage occurring in 35000 times or greater.

The rubber composition of an embodiment of the present technology preferably contains: per 100 parts by mass of the diene rubber, from 0.3 to 1.5 parts by mass of the cobalt borate neodecanoate, 0.5 parts by mass or greater but less than 3.0 parts by mass of the phenol-based resin, and from 0.5 to 5.0 parts by mass of the curing agent.

Furthermore, the rubber composition preferably contains from 0.1 to 1.0 parts by mass of a sulfenamide-based vulcanization accelerator per 100 parts by mass of the diene rubber.

The pneumatic tire in which the rubber composition of an embodiment of the present technology is used in a belt layer can enhance the adhesive performance to steel cords and can enhance the tire durability equal to or beyond conventional levels.

BRIEF DESCRIPTION OF THE DRAWING

The FIGURE is a partial cross-sectional view of a tire meridian direction illustrating one example of an embodiment of the pneumatic tire of the present technology.

DETAILED DESCRIPTION

The FIGURE is a cross-sectional view illustrating one example of an embodiment of the pneumatic tire of the present technology. The pneumatic tire is formed from a tread portion 1, a sidewall portion 2, and a bead portion 3.

In The FIGURE two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of a belt layer 8, formed by arranging steel cords extending inclined to the tire circumferential direction in the tire axial direction at a predetermined pitch and embedding these reinforcing cords in a rubber layer, is disposed on an outer circumferential side of the carcass layer 4 of the tread portion 1. The inclination direction with respect to the tire circumferential direction of the steel cords of the two belt layers 8 intersect so as to be opposite each other in the layers. A belt cover layer 9 is disposed outward of the belt layers 8. The coating rubber that coats the steel cords of the belt layer 8 is formed from the rubber composition for belts.

The rubber composition of an embodiment of the present technology contains, in a diene rubber containing a natural rubber, cobalt borate neodecanoate, a phenol-based resin, and a curing agent; a dynamic storage modulus (E') at 20° C. and a dynamic strain of 2% being 13 MPa or greater; a loss tangent (tan δ) at 60° C. being 0.20 or less; and the number of repetitions until breakage in a constant strain fatigue test at a strain of 60% and 400 rpm being 35000 times or greater.

In the present technology, the dynamic storage modulus (E') of the rubber composition at the dynamic strain of 2% and at 20° C. is 13 MPa or greater, preferably from 14 to 19 MPa, and more preferably from 14.5 to 17 MPa. When the dynamic storage modulus (E') is less than 13 MPa, the adhesive performance to steel cords is deteriorated, and tire durability becomes insufficient. The dynamic storage modulus (E') may be increased or decreased depending on the composition of the rubber composition and the vulcanization conditions, such as temperature and time. In the present specification, the dynamic storage modulus (E') is measured in accordance with JIS K 6394 by using a viscoelasticity spectrometer under the following conditions: the frequency of 20 Hz, the initial strain of 10%, the dynamic strain of 2%, and the temperature of 20° C.

In the rubber composition of an embodiment of the present technology, the loss tangent (tan δ) at 60° C. is 0.20 or less, preferably from 0.14 to 0.20, and more preferably from 0.15 to 0.19. When the tan δ at 60° C. is greater than 0.20, the adhesive performance to steel cords tends to be reduced, and tire durability becomes insufficient. The tan δ at 60° C. may be increased or decreased depending on the composition of the rubber composition and the vulcanization conditions, such as temperature and time. In the present specification, the tan δ at 60° C. is measured in accordance with JIS K 6394 by using a viscoelasticity spectrometer under the following conditions: the frequency of 20 Hz, the initial strain of 10%, the dynamic strain of 2%, and the temperature of 60° C.

Furthermore, for the tensile fatigue properties of the rubber composition, the number of repetitions until breakage in a constant strain fatigue test at a strain of 60% and 400 rpm is 35000 times or greater, and preferably 50000 times or greater. When the fatigue life at the strain of 60% of the rubber composition is less than 35000 times, the tire durability becomes insufficient. The tensile fatigue properties of the rubber composition may be adjusted depending on the composition of the rubber composition and the vulcanization conditions, such as temperature and time. In the present specification, the tensile fatigue properties of the rubber composition are measured, in accordance with JIS (Japanese Industrial Standard) K 6270, by using a dumbbell-shaped JIS No. 3 test piece (thickness: 2 mm) under conditions at 20° C., the strain of 60%, and the test frequency of 6.67 Hz (rotational speed of 400 rpm).

In the rubber composition of an embodiment of the present technology, the diene rubber always contains a natural rubber. The content of the natural rubber is preferably 80 mass % or greater, and more preferably from 90 to 100 mass %, per 100 mass % of the diene rubber. When the content of the natural rubber is less than 80 mass %, adhesiveness (e.g. crossply peel strength) to the steel cords cannot be ensured.

The rubber composition of an embodiment of the present technology can contain another diene rubber besides the natural rubber, as the diene rubber. Examples of another diene rubber include isoprene rubbers, butadiene rubbers, styrene-butadiene rubbers, acrylonitrile-butadiene rubbers, butyl rubbers, and halogenated butyl rubbers. Among these, isoprene rubbers, butadiene rubbers, styrene-butadiene rubbers, and halogenated butyl rubbers, are preferable. These diene rubbers may be used alone or as a desirable blend thereof. The content of such another diene rubber is preferably 20 mass % or less, and more preferably from 0 to 10 mass %, per 100 mass % of the diene rubber.

The rubber composition of an embodiment of the present technology enhances adhesiveness to steel cords as a result of containing cobalt borate neodecanoate. The cobalt borate neodecanoate is a compound represented by the general formula (1) below, and the compounded content thereof is preferably from 0.3 to 1.5 parts by mass, and more preferably greater than 0.5 parts by mass but 1.5 parts by mass or less, per 100 parts by mass of the diene rubber. When the compounded content of the cobalt borate neodecanoate is less than 0.3 parts by mass, durable adhesiveness and initial adhesiveness to steel cords may not be sufficiently enhanced. Furthermore, when the compounded content of the cobalt borate neodecanoate is greater than 1.5 parts by mass, on the contrary, constant strain fatigue properties are deteriorated, and tire durability may be reduced.

(1)

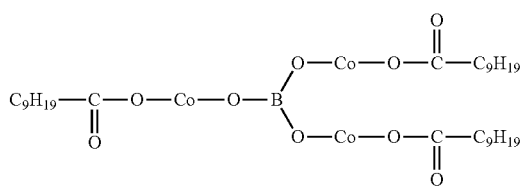

In the cobalt borate neodecanoate, the cobalt content is preferably from 18 to 26 mass %, and more preferably from 20 to 24 mass %. Examples of the cobalt borate neodecanoate include Manobond C22.5 and Manobond 680C available from Rhodia, CoMend A and CoMend B available from Shepherd, and DICNATE NBC-II available from DIC Corporation.

In the rubber composition of an embodiment of the present technology, a phenol-based resin and a curing agent thereof are contained in the diene rubber. By allowing the phenol-based resin and the curing agent to be contained, it is possible to enhance the hardness of the rubber composition, tensile elongation at break, and adhesive performance to steel cords, and achieve excellent tire durability.

Examples of the phenol-based resin include cresol resins, resorcin resins, alkylphenol resins, and modified phenol resins. Examples of the modified phenol resin include cashew-modified phenol resins, oil-modified phenol resins, epoxy-modified phenol resins, aniline-modified phenol resins, and melamine-modified phenol resins.

The cresol resin is a compound that is obtained by reacting cresol and formaldehyde, and is particularly preferably a compound using m-cresol.

Examples of the cresol resin include Sumikanol 610, available from Sumitomo Chemical Co., Ltd., and SP7000 available from Nippon Shokubai Co., Ltd.

The resorcin resin is a compound obtained by reacting resorcin and formaldehyde, and examples thereof include Penacolite B-18-S, Penacolite B-19-S, Penacolite B-20-S, and Penacolite B-21-S, available from INDSPEC Chemical Corporation. Furthermore, as the resorcin resin, a modified resorcin resin may be used, and examples thereof include resorcin resins modified by alkylphenol or the like as well as resorcin-alkylphenol-formalin copolymers.

The cashew-modified phenol resin is a phenol resin modified by using a cashew oil, and examples thereof include SUMILITE resin PR-YR-170 and SUMILITE resin PR-150 available from Sumitomo Bakelite Co., Ltd., and PHENOLITE A4-1419 available from DIC Corporation.

The phenol resin is an unmodified resin obtained by a reaction of phenol and formaldehyde, and examples thereof include Sumikanol 620 available from Sumitomo Chemical Co., Ltd.

The compounded content of the phenol-based resin is preferably 0.5 parts by mass or greater but less than 3.0 parts by mass, and more preferably from 0.7 to 2.0 parts by mass, per 100 parts by mass of the diene rubber. When the compounded content of the phenol-based resin is less than 0.5 parts by mass, the dynamic storage modulus (E') is reduced, tan δ at 60° C. is increased, adhesiveness to steel cords is reduced, and tire durability may be insufficient. Furthermore, when the compounded content of the phenol-based resin is 3.0 parts by mass or greater, on the contrary, tan δ at 60° C. is increased, constant strain fatigue properties are reduced, and tire durability may be reduced.

In an embodiment of the present technology, a curing agent that cures the phenol-based resin described above is contained. Examples of the curing agent include hexamethylenetetramine, hexamethoxymethyl melamine, hexamethoxymethylol melamine, pentamethoxymethyl melamine, hexaethoxymethyl melamine, polymers of para-formaldehyde, and N-methylol derivatives of melamine. One type of these methylene donors may be used alone, or any blend of these methylene donors may be used.

Examples of the hexamethylenetetramine include Sanceller HT-PO available from Sanshin Chemical Industry Co., Ltd. Examples of the hexamethoxymethylol melamine (HMMM) include CYREZ 964RPC available from Cytec Industries. Examples of the pentamethoxymethyl melamine (PMMM) include Sumikanol 507A available from Bara Chemical Co., Ltd.

The compounded content of the curing agent is preferably from 0.5 to 5.0 parts by mass, and more preferably from 0.7 to 4.0 parts by mass, per 100 parts by mass of the diene rubber. When the compounded content of the curing agent is less than 0.5 parts by mass, the dynamic storage modulus (E') is reduced, tan δ at 60° C. is increased, adhesiveness to steel cords is reduced, and tire durability may be insufficient. Furthermore, when the compounded content of the curing agent is greater than 5.0 parts by mass, constant strain fatigue properties are deteriorated, and tire durability may be reduced.

In the rubber composition of an embodiment of the present technology, sulfur and a vulcanization accelerator are blended in the diene rubber. The compounded content of the sulfur is preferably from 3.0 to 9.0 parts by mass, and more preferably from 4.0 to 8.0 parts by mass, per 100 parts by mass of the diene rubber. When the compounded content of the sulfur is less than 3.0 parts by mass, adhesiveness to steel cords is reduced. Furthermore, when the compounded content of the sulfur is greater than 9.0 parts by mass, tire durability may be reduced. In the present specification, the compounded content of the sulfur is a net compounded content of the sulfur contained in the sulfur and/or the vulcanizing agent blended for the vulcanization.

The vulcanization accelerator is not particularly limited and is preferably a sulfenamide-based vulcanization accelerator. Examples of the sulfenamide-based vulcanization accelerator include N,N-dicyclohexyl-1,3-benzothiazole-2-sulfenamide (DZ), N-cyclohexyl-2-benzothiazolesulfenamide (CZ), N-oxydiethylene-2-benzothiazolesulfenamide (OBS), and N-(tert-butyl)benzothiazole-2-sulfenamide (NS). One type of these sulfenamide-based vulcanization accelerators may be blended, or a combination of a plurality of these may be blended. Among these, N,N-dicyclohexyl-1,3-benzothiazole-2-sulfenamide (DZ) and/or N-(tert-butyl) benzothiazole-2-sulfenamide (NS) are preferably blended.

The compounded content of the vulcanization accelerator is preferably from 0.1 to 1.0 parts by mass, and more preferably from 0.2 to 0.8 parts by mass, per 100 parts by mass of the diene rubber. When the compounded content of the vulcanization accelerator is less than 0.1 parts by mass, tan δ at 60° C. becomes large, and tire durability may be reduced. Furthermore, when the compounded content of the vulcanization accelerator is greater than 1.0 parts by mass, adhesiveness when deterioration occurs may be reduced.

In the present technology, as an inorganic filler, any carbon black, silica, clay, talc, mica, calcium carbonate, and the like may be blended. Among these, carbon black and silica are preferable. Blending of the carbon black can increase the dynamic storage modulus (E'). Blending of the silica can make tan δ at 60° C. smaller.

The rubber composition can also contain various types of additives that are commonly used in rubber compositions for tires, such as vulcanization accelerators, anti-aging agents, peptizing agents, various oils, and plasticizers. These additives may be kneaded according to any common method to form a rubber composition and may be used in vulcanization or crosslinking. The compounded content of these additives may be any conventional quantity, as long as the present technology is not impaired. The rubber composition of an embodiment of the present technology can be produced by mixing each of the components described above using a commonly used rubber kneading machine, such as a Banbury mixer, a kneader, and a roll mill.

The rubber composition of an embodiment of the present technology can be advantageously used to form a steel cord coating portion of a pneumatic tire. The rubber composition is preferably used in a coating rubber that coats steel cords of the belt layer and/or the carcass layer. The rubber composition is particularly preferably used in a coating rubber that coats steel cords of the belt layer. The pneumatic tire that uses the rubber composition of an embodiment of the present technology in the coating rubber of steel cords can enhance the adhesive performance to steel cords and can thus suppress the separation between the steel cords and the coating rubber. By this, the durability of the pneumatic tire can be maintained and enhanced equal to or beyond conventional levels.

The present technology is further explained below by Examples. However, the scope of the present technology is not limited to these Examples.

EXAMPLES

To prepare 14 types of rubber compositions shown in Tables 1 and 2 (Examples 1 to 6, standard example, and Comparative Examples 1 to 7), components other than sulfur and vulcanization accelerator were weighed. These components were kneaded in a 1.7 L sealed Banbury mixer for 5 minutes. Then, a master batch was discharged and cooled at room temperature. This master batch was supplied to the 1.7 L sealed Banbury mixer, and the sulfur and the vulcanization accelerator were then added and mixed to obtain a rubber composition. In Tables 1 and 2, the compounded content of sulfur is a net compounded content of the sulfur contained in the vulcanizing agent (product) formed from the sulfur.

The rubber composition obtained as described above, except the rubber composition of Comparative Example 7, was vulcanized in a mold with a predetermined shape at 170° C. for 10 minutes to produce a test piece. The dynamic storage modulus (E'), the tan δ at 60° C., and the constant strain fatigue test were evaluated by the methods described below. Note that, for the rubber composition of Comparative Example 7, a test piece was produced in the vulcanization condition at 170° C. for 5 minutes. The adhesiveness to steel cords (index value of amount of rubber adhesion) and the tire durability test were also performed by the method described below.

Dynamic Storage Modulus (E'), Tan δ at 60° C.

Using a viscoelastic spectrometer, available from Toyo Seiki Seisaku-sho, Ltd., the dynamic storage modulus (E') at the temperature of 20° C. and the loss tangent tan δ at the temperature of 60° C. of the obtained test piece were measured in accordance with JIS K 6394 under conditions at the initial strain of 10%, the dynamic strain of ±2%, and the frequency of 20 Hz. The obtained results of E' and tan δ are shown in the "E' at 20° C." row and the "tan δ at 60° C." row of Tables 1 and 2.

Constant Strain Fatigue Test

Using the obtained test piece, a dumbbell-shaped JIS No. 3 test piece was produced in accordance with JIS K 6251. A constant strain tension fatigue test was performed under conditions at 20° C., the strain of 60%, and the test frequency of 6.67 Hz (rotational speed of 400 rpm) in accordance with JIS K 6270. The number of repetitions until breakage occurred was measured. The obtained result is recorded in the "constant strain tension fatigue properties" row of Tables 1 and 2.

Adhesiveness to Steel Cords (Index Value of Amount of Rubber Adhesion)

Brass-plated steel cords, which were arranged in parallel with a 12.7 mm interval, were coated with the rubber composition, except Comparative Example 7, and were embedded in the embedded length of 12.7 mm and vulcanization-bonded in the vulcanization condition at 170° C. for 10 minutes to produce a sample. The steel cords were drawn out from the sample in accordance with ASTM (American Society for Testing and Materials) D-2229, and the surface thereof was evaluated by the index value of amount of rubber adhesion (%) of the coating. The obtained result is recorded in the "index value of amount of rubber adhesion" row of Tables 1 and 2.

Tire Durability Test

A pneumatic tire (size 295/35R21) was vulcanization-molded by using each of the rubber compositions except the rubber composition of Comparative Example 7 among the obtained rubber compositions in a coating rubber of a belt layer. The obtained tire was mounted on a rim (21×10.5 J) and filled with a gas having the oxygen concentration of 100% to the air pressure of 350 kPa and allowed to stand still in an environment at the temperature of 70° C. for 14 days. Thereafter, the air pressure was adjusted to 170 kPa, and the traveling test for 6000 km in a condition at the speed of 60 km/h was performed by using an indoor drum testing machine that had the drum diameter of 1707 mm and that was in accordance with JIS D 4230 while the load was increased from 88%, which was the load specified by JATMA (Japan Automobile Tyre Manufacturers Association, Inc.), by 13% every two hours. After the traveling test, the amount (mm) of the edge separation in the belt layer was measured by disassembling the tire. The obtained result is recorded in the "tire durability (separated amount)" row of Tables 1 and 2.

TABLE 1

|  |  | Standard Example | Example 1 | Example 2 | Example 3 |
|---|---|---|---|---|---|
| NR | Parts by mass | 100 | 100 | 100 | 100 |
| CB | Parts by mass | 60 | 60 | 60 | 60 |
| Co stearate | Parts by mass | 2.0 | 1.0 | 0.5 | |
| Co borate neodecanoate | Parts by mass | | 0.5 | 1.0 | 1.5 |
| Phenol-based resin | Parts by mass | 1.0 | 1.0 | 1.0 | 1.0 |
| Curing agent | Parts by mass | 3.0 | 3.0 | 3.0 | 3.0 |
| Zinc oxide | Parts by mass | 8.0 | 8.0 | 8.0 | 8.0 |
| Anti-aging agent | Parts by mass | 1.0 | 1.0 | 1.0 | 1.0 |
| Sulfur | Parts by mass | 6.0 | 6.0 | 6.0 | 6.0 |
| Vulcanization accelerator | Parts by mass | 0.7 | 0.7 | 0.7 | 0.7 |
| E' at 20° C. | MPa | 15.1 | 15.2 | 15.3 | 15.2 |
| tan δ at 60° C. | — | 0.18 | 0.18 | 0.17 | 0.17 |
| Constant strain tension fatigue properties | Number of repetitions | 34000 | 55000 | 61000 | 72000 |
| Index value of amount of rubber adhesion | % | 60 | 80 | 85 | 90 |
| Tire durability (separated amount) | mm | 4 | 1 | 1 | 2 |

|  |  | Example 4 | Example 5 | Example 6 |
|---|---|---|---|---|
| NR | Parts by mass | 100 | 100 | 100 |
| CB | Parts by mass | 60 | 60 | 60 |
| Co stearate | Parts by mass | 1.0 | 1.0 | 1.0 |
| Co borate neodecanoate | Parts by mass | 0.5 | 0.5 | 0.5 |
| Phenol-based resin | Parts by mass | 2.5 | 2.0 | 1.0 |
| Curing agent | Parts by mass | 3.0 | 4.0 | 3.0 |
| Zinc oxide | Parts by mass | 8.0 | 8.0 | 8.0 |
| Anti-aging agent | Parts by mass | 1.0 | 1.0 | 1.0 |
| Sulfur | Parts by mass | 6.0 | 6.0 | 3.0 |
| Vulcanization accelerator | Parts by mass | 0.7 | 0.7 | 0.7 |
| E' at 20° C. | MPa | 17.50 | 18.30 | 14.20 |
| tan δ at 60° C. | — | 0.19 | 0.18 | 0.19 |

TABLE 1-continued

| Constant strain tension fatigue properties | Number of repetitions | 50000 | 45000 | 60000 |
| Index value of amount of rubber adhesion | % | 80 | 75 | 65 |
| Tire durability (separated amount) | mm | 2 | 2 | 3 |

TABLE 2-1

| | | Comparative Example 1 | Comparative Example 2 | Comparative Example 3 | Comparative Example 4 |
|---|---|---|---|---|---|
| NR | Parts by mass | 100 | 100 | 100 | 100 |
| CB | Parts by mass | 60 | 60 | 60 | 60 |
| Co stearate | Parts by mass | 1.9 | | 1.0 | 1.0 |
| Co borate neodecanoate | Parts by mass | 0.1 | 2.0 | 0.5 | 0.5 |
| Phenol-based resin | Parts by mass | 1.0 | 1.0 | 0.2 | 3.5 |
| Curing agent | Parts by mass | 3.0 | 3.0 | 3.0 | 3.0 |
| Zinc oxide | Parts by mass | 8.0 | 8.0 | 8.0 | 8.0 |
| Anti-aging agent | Parts by mass | 1.0 | 1.0 | 1.0 | 1.0 |
| Sulfur | Parts by mass | 6.0 | 6.0 | 6.0 | 6.0 |
| Vulcanization accelerator | Parts by mass | 0.7 | 0.7 | 0.7 | 0.7 |
| E' at 20° C. | MPa | 15.0 | 16.5 | 12.5 | 16.5 |
| tan δ at 60° C. | — | 0.18 | 0.20 | 0.22 | 0.25 |
| Constant strain tension fatigue properties | Number of repetitions | 34000 | 20000 | 40000 | 23000 |
| Index value of amount of rubber adhesion | % | 65 | 80 | 50 | 80 |
| Tire durability (separated amount) | mm | 4 | 5 | 5 | 4 |

| | | Comparative Example 5 | Comparative Example 6 | Comparative Example 7 |
|---|---|---|---|---|
| NR | Parts by mass | 100 | 100 | 100 |
| CB | Parts by mass | 60 | 60 | 60 |
| Co stearate | Parts by mass | 1.0 | 1.0 | 1.0 |
| Co borate neodecanoate | Parts by mass | 0.5 | 0.5 | 0.5 |
| Phenol-based resin | Parts by mass | 1.0 | 1.0 | 1.0 |
| Curing agent | Parts by mass | 0.2 | 6.0 | 3.0 |
| Zinc oxide | Parts by mass | 8.0 | 8.0 | 8.0 |
| Anti-aging agent | Parts by mass | 1.0 | 1.0 | 1.0 |
| Sulfur | Parts by mass | 6.0 | 6.0 | 6.0 |
| Vulcanization accelerator | Parts by mass | 0.7 | 0.7 | 0.7 |
| E' at 20° C. | MPa | 12.0 | 15.5 | 11.0 |
| tan δ at 60° C. | — | 0.31 | 0.17 | 0.23 |
| Constant strain tension fatigue properties | Number of repetitions | 40000 | 30000 | 30000 |
| Index value of amount of rubber adhesion | % | 55 | 70 | |
| Tire durability (separated amount) | mm | 4 | 5 | |

The types of raw materials used in Tables 1 and 2 are shown below.

NR: natural rubber; TSR20

CB: carbon black; SEAST 300, available from Tokai Carbon Co., Ltd.

Co stearate: cobalt stearate; cobalt stearate, available from DIC Corporation (cobalt content: 9.5 mass %)

Co borate neodecanoate: cobalt borate neodecanoate; DICNATE NBC-II, available from DIC Corporation (cobalt content: 22.2 mass %)

Phenol-based resin: resorcin resin; PENACOLITE RESIN B-18-S, available from INDSPEC Curing agent: hexamethoxymethylol melamine (HMMM); CYREZ 964RPC, available from Cytec Industries Zinc oxide: Zinc Oxide III, available from Seido Chemical Industry Co., Ltd.

Anti-aging agent: Santoflex 6PPD, available from Flexsys

Sulfur: MUCRON OT-20, available from Shikoku Chemicals Corporation (sulfur content: 80 mass %)

Vulcanization accelerator: N,N-dicyclohexyl-1,3-benzothiazole-2-sulfenamide; Nocceler DZ, available from Ouchi-Shinko Chemical Industrial Co., Ltd.

As is clear from Table 1, with the rubber compositions of Examples 1 to 6, it was confirmed that the amount of rubber adhesion (%) adhered to steel cords was large, the amount of edge separation at the belt layer was suppressed, and the tire durability was enhanced equal to or beyond the tire durability of the standard example.

As is clear from Table 2, with the rubber compositions of Comparative Examples 1 and 2, the amount of edge separation became large because the constant strain fatigue life was less than 35000 times.

Since the rubber composition of Comparative Example 3 had the dynamic storage modulus (E') at 20° C. of less than 13 MPa and the tan δ at 60° C. of greater than 0.20, the adhesiveness to steel cords (index value of amount of rubber adhesion) was poor, and the amount of edge separation became large.

Since the rubber composition of Comparative Example 4 had the tan δ at 60° C. of greater than 0.20 and the constant strain fatigue life of less than 35000, the amount of edge separation became large.

Since the rubber composition of Comparative Example 5 had the dynamic storage modulus (E') at 20° C. of less than 13 MPa and the tan δ at 60° C. of greater than 0.20, the adhesiveness to steel cords (index value of amount of rubber adhesion) was poor, and the amount of edge separation became large.

Since the rubber compositions of Comparative Example 6 had the constant strain fatigue life of less than 35000 times, the amount of edge separation became large.

Since the rubber composition of Comparative Example 7 was under-vulcanized as a result of being vulcanized in the condition at 170° C. for 5 minutes, had the dynamic storage modulus (E') at 20° C. of less than 13 MPa, the tan δ at 60° C. of greater than 0.20, and the constant strain tension fatigue properties of less than 35000 times, the tire durability was poor among the pneumatic tires formed from the rubber compositions for steel cord coating.

The invention claimed is:

1. A rubber composition comprising:
   a diene rubber containing a natural rubber,
   from 0.3 to 1.5 parts by mass of cobalt borate neodecanoate per 100 parts by mass of the diene rubber,
   0.5 parts by mass or greater but less than 3.0 parts by mass of a phenol-based resin per 100 parts by mass of the diene rubber,
   from 0.5 to 5.0 parts by mass of a curing agent per 100 parts by mass of the diene rubber, and
   from 0.5 to 1.0 parts by mass of cobalt stearate per 100 parts by mass of the diene rubber;
   a dynamic storage modulus (E') at 20° C. and a dynamic strain of 2% being 13 MPa or greater;
   a loss tangent (tan δ) at 60° C. being 0.20 or less; and
   a number of repetitions until breakage in a constant strain fatigue test at a strain of 60% and 400 rpm being 35000 times or greater.

2. The rubber composition according to claim 1, comprising from 0.1 to 1.0 parts by mass of a sulfenamide-based vulcanization accelerator per 100 parts by mass of the diene rubber.

3. A pneumatic tire comprising a belt layer produced by using the rubber composition described in claim 1.

* * * * *